(12) United States Patent
Van Den Berg et al.

(10) Patent No.: US 7,836,848 B2
(45) Date of Patent: Nov. 23, 2010

(54) ASSEMBLY FOR FEEDING AND MILKING ANIMALS, AND A METHOD OF FEEDING AND MILKING ANIMALS

(75) Inventors: Karel Van Den Berg, Bleskensgraaf (NL); Greorgius Rudolphius Bos, The Hague (NL); Koen Arseen Jean Ally, Deurle (BE)

(73) Assignee: Lely Enterprises AG, Zug (CH)

( * ) Notice: Subject to any disclaimer, the term of this patent is extended or adjusted under 35 U.S.C. 154(b) by 0 days.

(21) Appl. No.: 12/621,574

(22) Filed: Nov. 19, 2009

(65) Prior Publication Data

US 2010/0064974 A1    Mar. 18, 2010

Related U.S. Application Data

(62) Division of application No. 10/248,799, filed on Feb. 19, 2003, now Pat. No. 7,640,889.

(30) Foreign Application Priority Data

Feb. 19, 2002    (NL) .................................... 1020004

(51) Int. Cl.
    *A01J 5/00*    (2006.01)
(52) U.S. Cl. .................................. 119/14.02; 119/14.18
(58) Field of Classification Search ............. 119/14.01, 119/14.02, 14.03, 14.08, 14.1, 14.11, 14.14, 119/14.18, 51.01, 51.02
    See application file for complete search history.

(56) References Cited

U.S. PATENT DOCUMENTS

| | | | |
|---|---|---|---|
| 3,223,070 A | 12/1965 | Gribble et al. | |
| 4,034,711 A | 7/1977 | Bender et al. | |
| 4,508,058 A | 4/1985 | Jakobson et al. | |
| 5,596,945 A * | 1/1997 | van der Lely | 119/14.03 |
| 5,704,311 A | 1/1998 | Van den Berg | |
| 5,771,837 A * | 6/1998 | van der Lely | 119/14.02 |
| 5,778,820 A * | 7/1998 | van der Lely et al. | 119/14.18 |
| 5,784,994 A * | 7/1998 | van der Lely | 119/14.08 |
| 5,950,562 A * | 9/1999 | Schulte et al. | 119/51.02 |

(Continued)

FOREIGN PATENT DOCUMENTS

EP    0635203  A2    1/1995

(Continued)

OTHER PUBLICATIONS

RD3744022A.

*Primary Examiner*—T. Nguyen
(74) *Attorney, Agent, or Firm*—David P. Owen; Coraline J. Haitjema; Howrey LLP

(57) ABSTRACT

An assembly and method for feeding and milking animals is disclosed. The assembly is provided with an area where the animals are allowed to move freely, with a number of juxtaposed feeding stations for the animals, and with a retaining device for retaining an animal at a feeding station. The retaining device can be activated for retaining an animal and can be deactivated for releasing an animal. A mobile milking robot connects at least one teat cup to a teat of an animal, a computer system controlling the operation and movement of the milking robot. The mobile milking robot is a self-propelled mobile milking robot, and the retaining device is fixedly disposed at the feeding station.

11 Claims, 6 Drawing Sheets

U.S. PATENT DOCUMENTS

| | | |
|---|---|---|
| 6,019,061 A | 2/2000 | Schulte |
| 6,394,027 B2 | 5/2002 | Gallagher et al. |
| 6,463,877 B1 * | 10/2002 | van der Lely ............ 119/14.08 |
| 6,938,576 B2 | 9/2005 | Van der Lely et al. |
| 2001/0054392 A1 * | 12/2001 | Fransen et al. ........... 119/14.08 |
| 2002/0033137 A1 | 3/2002 | Van der Lely et al. |
| 2002/0033138 A1 * | 3/2002 | Brayer .................... 119/14.03 |
| 2002/0033140 A1 * | 3/2002 | Van der Lely et al. .... 119/14.11 |

FOREIGN PATENT DOCUMENTS

| | | |
|---|---|---|
| EP | 1188366 A1 | 3/2002 |
| FR | 2298943 A | 8/1976 |
| FR | 2313866 A | 1/1997 |

\* cited by examiner

ASSEMBLY FOR FEEDING AND MILKING ANIMALS, AND A METHOD OF FEEDING AND MILKING ANIMALS

CROSS REFERENCE TO RELATED APPLICATIONS

This application is a division of U.S. patent application Ser. No. 10/248,799 filed Feb. 19, 2003, and claims priority from Dutch patent application no. 1020004 filed Feb. 19, 2002, the contents of which are hereby incorporated by reference in their entirety.

BACKGROUND OF THE INVENTION

1. Field of the Invention

The invention relates to an assembly for feeding and milking animals, the assembly being provided with an area where the animals are allowed to move freely, with a number of juxtaposed feeding stations for the animals, with a retaining device for retaining an animal at a feeding station, which retaining device can be activated for retaining an animal and can be deactivated for releasing an animal, with a mobile milking robot for connecting at least one teat cup to a teat of an animal, and with a computer system for controlling the operation and movement of the milking robot.

2. Description of the Related Art

An assembly is known from EP A 0635203 in which a mobile milking robot is moved along a rail and can be moved to a relevant feeding station. The mobile milking robot is provided with a retaining device for retaining an animal during milking. In order to integrate such an assembly for example into a customary cowshed, a number of extensive modifications are required that make the assembly economically less interesting. Moreover, it has been found that certain animals behave restlessly during milking. Further, the construction of the mobile milking robot of the known assembly should be extremely solid in order to retain the animal to be milked at its place during milking. Moreover, the approach of the mobile milking robot with the retaining device is experienced by the animals as threatening, which may lead to unrest, stress or even running away.

BRIEF SUMMARY OF THE INVENTION

It is therefore desirable to provide an assembly for feeding and milking animals that can be integrated in a simple manner into an existing cowshed. It is also desirable to provide an assembly in which restless animals can be calmed in a simple manner during milking. It is furthermore desirable to provide an assembly in which the mobile milking robot can be designed in a constructively simple and, consequently, cheaper manner.

To this end, an assembly of the above-described type according to the invention is characterized in that the mobile milking robot is a self-propelled mobile milking robot, and in that the retaining device is fixedly disposed at the feeding station. Due to the fact that the retaining device is not disposed on the mobile milking robot, the mobile milking robot can be designed in a constructively simpler and, consequently, cheaper manner. Moreover, due to the fact that the mobile milking robot is self-propelled, i.e. is freely movable (not necessarily along a rail), the number of adaptations for integrating an assembly into for example a cowshed is small. Further, due to the fact that the mobile milking robot does not comprise a retaining device, it is no longer frightening for the animals.

Although the feeding stations may be disposed lengthways, with a view to an efficient spatial arrangement it is advantageous if the feeding stations are juxtaposed in their longitudinal direction. Moreover, this has the extra advantage that the mobile milking robot can move more quickly from one animal to the other, for example by moving transverse to the animals and underneath the animals.

In a particularly advantageous embodiment of an assembly according to the invention, the assembly is provided with a feeding gate, and the feeding station is provided with a first feeding station portion, that is intended as a stand for an animal, and with a second feeding station portion, that is intended for containing feed, the feeding gate being disposed between the first feeding station portion and the second feeding station portion. Although the retaining device may be a separate device, with a view to constructive simplicity it is advantageous if the retaining device is integrated in the feeding gate. The feeding gate preferably extends over at least two feeding stations, and in particular extends over all the juxtaposed feeding stations. Such feeding gates are known per se and can be used without problems in an assembly according to the invention.

An accurate functioning of an assembly according to the invention can be obtained if the assembly is provided with an animal-position-determining device for determining the position of the animal relative to the retaining device and/or the feeding gate. The retaining device can in particular be activated partially with the aid of data from the animal-position-determining device, so that retaining of an animal that has not assumed a correct position can be prevented. In a further embodiment of an assembly according to the invention, the assembly is provided with an animal identification device for identifying an animal at a feeding station. Moreover, data from such an animal-position-determining device, in particular in combination with the animal identification device, can give an indication of the preference of an animal for a particular feeding station. Moreover, by these means or by other means that are appropriate for that purpose, the assembly can be suitable for determining the feeding station where an animal to be milked is present and for activating the relevant retaining device for retaining said animal at the determined feeding station. Moreover, the mobile milking robot can thus be guided to that relevant feeding station.

In a further embodiment of an assembly according to the invention, the assembly is suitable for activating the retaining device of at least one adjacent feeding station that is adjacent to the determined feeding station. This embodiment of the invention is based on the insight that an animal that has been milked by the assembly known from EP A 0635203 may behave restlessly just because it is not always among other animals during milking. According to this embodiment of the invention, this restlessness is prevented by retaining not only the animal to be milked, but also at least one nearby animal. The assembly is in particular suitable for calming the animals if the assembly is suitable for activating the retaining devices of the feeding stations that are located at any rate immediately on both sides of the determined feeding station.

In an embodiment of an assembly according to the invention, the retaining device respectively the retaining devices is/are activated partially with the aid of data from the animal identification device. In this way not only animals to be milked, but also animals mentioned in an attention list, or animals on which an animal related treatment different from milking, such as shaving, vaccinating, claw treatment, etc., has to be performed, can be retained. Consequently, the invention also relates to an assembly of a device for feeding animals and a device for performing an animal related treatment on animals, the assembly being provided with an area where the animals are allowed to move freely, with a number of juxtaposed feeding stations for the animals, with a retaining device for retaining an animal at a feeding station, which retaining device can be activated for retaining an animal and can be deactivated for releasing an animal, with a mobile device for automatically performing the animal related treatment and with a computer system for controlling the operation and movement of the mobile device, characterized in that the mobile device for performing the animal related treatment is a self-propelled mobile device, and in that the retaining device is fixedly disposed at the feeding station. According to the invention, said assembly can have the same advantageous embodiments as the assembly for milking an animal, the arrangement being such that the means for milking are replaced by means for performing the animal related treatment.

In a further embodiment of an assembly according to the invention, the computer system is provided with an activation file for containing per animal data in relation to whether or not activating a relevant retaining device during milking an animal. Because of the fact that certain animals need not to be retained during milking, or nearby animals need not to be retained, such a file can advantageously be used for operating the assembly. Said activation file may also contain actualized data in relation to animals that should be milked, the animals then being provided in particular with a priority in milking sequence.

An assembly that is constructively relatively simple is obtained if all the retaining devices can be deactivated centrally and at least substantially simultaneously. However, this offers to an animal that should actually be milked the possibility of moving away from the feeding gate, which, in general, does not constitute a drawback due to the fact that the animals are located at the feeding gate and/or the feeding station several times a day and for a rather long time. An efficient control of the mobile milking robot is made possible, on the contrary, if each retaining device can be deactivated individually, in which case, consequently, the retaining device respectively the retaining devices is/are deactivated partially with the aid of data from the animal identification device.

In a further embodiment of an assembly according to the invention, the computer system is provided with a deactivation file for containing per animal data in relation to the deactivation of the retaining device. Such a deactivation file may contain the deactivation for the animal itself, for example retaining the animal during the connection of the teat cup, then releasing the animal and/or releasing nearby animals at a certain point of time. The deactivation file is in particular suitable for containing per animal data in relation to a period between activation and deactivation. Such a period may be a fixed period or a variable period (for example depending on attaining a particular milk yield, or milk flow, etc.). The computer system and/or the mobile milking robot then preferably control(s) the deactivation of the retaining device respectively the retaining devices. The assembly preferably comprises a milking-process-stage device for determining the stage of the milking process, the deactivation of the retaining device respectively the retaining devices being controlled at least partially with the aid of data from the milking-process-stage device (for example depending on attaining a particular milk yield, or milk flow, etc.).

In order to shorten the distance the mobile milking robot has to cover for reaching an animal to be milked, in an embodiment of an assembly according to the invention, the assembly is provided with a position-determining device for determining the position of the mobile milking robot, the assembly being suitable for activating the retaining device respectively the retaining devices of feeding stations within a predetermined distance from the determined position of the milking robot.

In a further embodiment of an assembly according to the invention, the milking robot has a main direction, and the assembly is provided with a first orientation device for determining the orientation of the main direction of the animal to be milked, and with a second orientation device for determining the orientation of the main direction of the milking robot, the milking robot being positioned relative to the animal at least partially with the aid of data from the first and the second orientation device. In this way the mobile milking robot can be positioned in a certain position, for example under the animal, so that the mobile milking robot does not hinder other animals during milking. In particular at least a part of the first and/or the second orientation device is disposed on the milking robot. According to an embodiment of an assembly according to the invention, the mobile milking robot is dimensioned such that it is capable of being placed as a whole under a cow between the legs of said cow.

In order to prevent the mobile milking robot from obstructing the free circulation of the animals in the area where the animals are allowed to move freely, the assembly comprises a milking robot path for the milking robot, which robot path is separated from the area where the animals are allowed to move freely. In this way contamination of the mobile milking robot, for example by dung from the animals, is also prevented. It is pointed out here that the first feeding station portion is in general free from dirt, so that the mobile milking robot can move over said portion without being contaminated. Therefore, the robot path is in particular contiguous to the second feeding station portion, such that the second feeding station portion is located between the robot path and the first feeding station portion. It is thus possible for the mobile milking robot to move via the second feeding station portion to the first feeding station portion to milk the animal there. The second feeding station portions may be interrupted, if desired, by crossing-places for the mobile milking robot.

Consequently, in an embodiment of an assembly according to the invention, the mobile milking robot can be moved from the robot path to the first feeding station portion. A part of the robot path may be provided, if desired, with a control device for moving the mobile milking robot from the robot path at a defined place. The feeding gate is preferably designed such that the mobile milking robot can be moved through the feeding gate.

If the assembly comprises an occupation-detecting device for detecting the occupation of a feeding station, it is in particular possible for the mobile milking robot to be movable partially with the aid of data from the occupation-detecting device. The occupation-detecting device may be suitable for example for detecting an unoccupied feeding station that is located closest to the feeding station where an animal to be milked is located, so that the mobile milking robot can move to the animal to be milked via said unoccupied feeding station.

The assembly is preferably provided with two rows of juxtaposed feeding stations for the animals, the rows extending in particular at least substantially parallel to each other, and the robot path being located between the two rows.

In an embodiment of an assembly according to the invention, the mobile milking robot is provided with all the milking means that are required for milking an animal. In the assembly known from EP A 0635203, extensive modifications are required for conveying the milk obtained by means of the milking robot at any place situated at the side of the rail along which the milking robot can move, to a milk-collecting tank. Due to the fact that the mobile milking robot is provided with these milking means, adaptations in the cowshed where the assembly is integrated for conveying the collected milk to a collecting tank, such as long milk lines for example, are superfluous. The mobile milking robot according to the invention can move automatically to said milk-collecting tank.

In order to shorten the way to be covered by the mobile milking robot for reaching a milk-collecting tank, in an embodiment of an assembly according to the invention, the milk-collecting tank is disposed so as to be contiguous to the robot path. The milk-collecting tank is preferably located at an end of the robot path. If the robot path has a considerable length, the assembly is preferably provided with drain points near the robot path, which drain points are connected to the milk-collecting tank and can be connected to the mobile milking robot.

In an embodiment of an assembly according to the invention, the assembly comprises a cowshed with an entrance and the other end of the robot path is contiguous to the entrance. In this way the robot path can for example also be used by a vehicle for supplying for example roughage to the feeding stations.

If the milking robot is provided with a milking-run-end-determining device for detecting the end of a milking run, then, in particular partially with the aid of data from the milking-run-end-determining device, the milking robot can be moved to the milk-collecting tank.

In an embodiment of an assembly according to the invention, the milking robot comprises a milk storage jar, and the assembly is provided with a conveying device for conveying milk from the milk storage jar to the milk-collecting tank. The milk storage jar is preferably provided at its lower side with an outlet. For the purpose of automating the functioning of the assembly to a high degree, the conveying device can automatically be coupled to the outlet of the milk storage jar. Here it is advantageous if the conveying device is provided with a coupling detector, in which case the conveying device can in particular be activated with the aid of data from the coupling detector. Such automatic coupling means are known per se in other technical fields and can be applied, after minor modification, to the assembly according to the invention.

In order to prevent that the mobile milking robot collides with another vehicle on the robot path, the robot path is preferably provided with robot refuge areas that are only intended for the mobile milking robot. If the assembly is provided with a refuge-signal-emitting device for moving the mobile milking robot to a robot refuge area, then a highly reliable system can be obtained. Such a refuge-signal-emitting device may for example be disposed on a vehicle and be operated by a farmer whilst indicating that the vehicle is going to turn into the robot path.

In an embodiment of an assembly according to the invention, the mobile milking robot is provided with its own energy supply. The energy supply is preferably rechargeable, the assembly in particular being provided with a charger device for charging the energy supply. The charger device is preferably disposed near the milk-collecting tank. The rechargeable energy supply is advantageously provided with a charging port, and the charger device can automatically be coupled to the charging port. Here it is advantageous for safety reasons if the charger device is provided with a coupling detector, in which case the charger device can be activated with the aid of data from the coupling detector. Such a charger device that can automatically be coupled is known per se and can be applied to the assembly according to the invention.

For the purpose of guaranteeing a correct functioning of the assembly and being informed in time of malfunctions, if any, in an embodiment of an assembly according to the invention the mobile milking robot is provided with a malfunction detector for detecting an internal malfunction. The assembly is preferably provided with an alarm-signal-issuing device for issuing an alarm signal with the aid of data from the malfunction detector. For the purpose of guaranteeing the safety of the animals, the deactivation of the retaining device is controlled at least partially with the aid of data from the malfunction detector, and/or the milking robot is deactivated with the aid of data from the malfunction detector.

For the purpose of monitoring the functioning of the assembly, the assembly is provided with following means for following mobile units, constituted for example by the animals and the mobile milking robot, in the assembly. Such following means may also be used for determining the position of one of the mobile units at a certain point of time. The following means preferably comprise at least one camera.

For the purpose of cleaning and/or disinfecting the mobile milking robot, in an embodiment of an assembly according to the invention the assembly is provided with a cleaning device for cleaning and/or disinfecting the exterior of the mobile milking robot. The assembly is preferably further provided with a cleaning device for cleaning and/or disinfecting the milking means for milking an animal. The cleaning device is advantageously disposed near the milk-collecting tank. Also in this case it holds that the cleaning device can automatically be coupled to the mobile milking robot, and that cleaning and/or disinfecting are/is performed automatically.

If the mobile milking robot is provided with a vicinity detector for detecting the vicinity of an object, collisions with other objects can for example be prevented. The milking robot is in particular provided with a protecting device for protecting at least a part of the milking robot, in which case the protecting device can be brought from an inactive position into an active protecting position, preferably with the aid of data from the vicinity detector. In this way it is possible, for example when an animal threatens to kick with its leg against the milking robot, to bring the protecting device, for example an inflatable bag, into the active protecting position.

The vicinity detector preferably comprises a camera. Alternatively or additionally, the vicinity detector comprises an approach sensor.

If the milking robot is provided with a signal-issuing device for issuing a perceptible signal, the mobile milking robot can timely indicate its presence, for example for preventing a collision. The signal-issuing device can in particular be activated with the aid of data from the vicinity detector.

In an embodiment of an assembly according to the invention, the assembly is provided with closing means that are capable of being activated for closing a feeding station. In this way the occupation of the feeding stations can be controlled. For example, if, for the purpose of being milked restfully, an animal must be positioned between two other animals, said animal should not be admitted to a feeding station located at the end. Furthermore, partially by means of an appropriate accessibility to feeding stations, the distance to be covered by the milking robot, and consequently the route to be followed for milking the whole herd, can be optimized. In this case, in particular the closing means that are capable of being activated are controlled partially with the aid of data from the animal-position-determining device and/or with the aid of data from the animal identification device and/or with the aid of data from the computer system and/or the mobile milking robot.

In an embodiment of an assembly according to the invention, the mobile milking robot is provided with milking data means for determining milking data during milking an animal. Examples of such data are: the point of time of milking, the duration of the milking, the milk flow, the milk temperature, the amount of milk obtained, etc. Such data are preferably transmitted to the computer system via a transmission device of the mobile milking robot. On the basis of these data, the computer system can update a working file for containing data about animals that should be milked within a certain period of time. The mobile milking robot and/or the retaining devices are preferably controlled with the aid of data from the working file. In this case it is advantageous if the mobile milking robot and/or the retaining devices are controlled with the aid of data from the animal-position-determining device and/or the animal identification device.

The self-propelled mobile milking robot is provided with a control program for controlling the mobile milking robot by the assembly, the milking robot in particular being provided with position-determining means, such as for example an ultrasonic sensor, GPS or the like, for providing position information to be used in the control program. In this case also data from the working file and the like are used. Software that is known per se may be used for optimizing, with the aid of available data (obtained beforehand or currently), the route of the milking robot through the herd in such a way that one mobile milking robot suffices for milking a herd consisting of approximately 60 animals.

The invention further relates to a method of feeding and milking animals, which method comprises the step of retaining an animal during feeding said animal, the step of moving a mobile milking robot to the animal, and the step of milking the animal, characterized in that the method is performed in a feeding area that is provided with a number of juxtaposed feeding stations for the animals, each feeding station having a longitudinal direction, and the feeding stations being juxtaposed in their longitudinal direction, and in that the method comprises the step of retaining an animal present in at least one adjacent feeding station that is adjacent to the determined feeding station. Advantageous embodiments are described in the sub-claim.

The invention further relates to an assembly for performing an animal related treatment on an animal, the assembly being provided with an area where the animal is allowed to move freely, and with a mobile device for performing the animal related treatment, characterized in that the mobile device has a main direction, and in that the assembly is provided with a first orientation device for determining the orientation of the main direction of the animal to be treated, and a second orientation device for determining the orientation of the main direction of the mobile device, the mobile device being positioned relative to the animal with the aid of data from the first and the second orientation device.

The invention further relates to a method of feeding and milking animals that are allowed to move freely in an area intended therefor, which method comprises the following steps:

supplying roughage in a roughage station with a number of feeding positions that are freely accessible to the animals, selecting at least one animal to be milked from the set of animals present in the roughage station, retaining temporarily a subset of the animals present in the roughage station with the aid of retaining devices that can be activated and deactivated and that are permanently provided at each feeding position, which subset comprises at least said one selected animal, moving a mobile milking robot to said one animal that has been retained and selected, and positioning the mobile milking robot relative to said animal that has been retained and selected, and milking said animal that has been retained and selected by means of the mobile milking robot.

BRIEF DESCRIPTION OF THE DRAWINGS

An embodiment of an assembly and a method according to the invention will be described hereinafter by way of example only with reference to the drawings, in which.

DESCRIPTION OF ILLUSTRATIVE EMBODIMENTS

The following is a description of certain embodiments of the invention, given by way of example only and with reference to the drawings.

The invention will be described hereinafter with reference to milking as an animal related treatment to be performed on an animal, for example a cow. However, it will be obvious that also other animal related treatments can be applied within the scope of the invention, such as shaving, vaccination, claw treatment, insemination and the like. Within the scope of the invention by 'feeding' and 'feeding station' is meant 'feeding and/or watering' and 'feeding and/or watering station', respectively. References to feed are also intended to encompass roughage and the provision of roughage.

Figure 1:
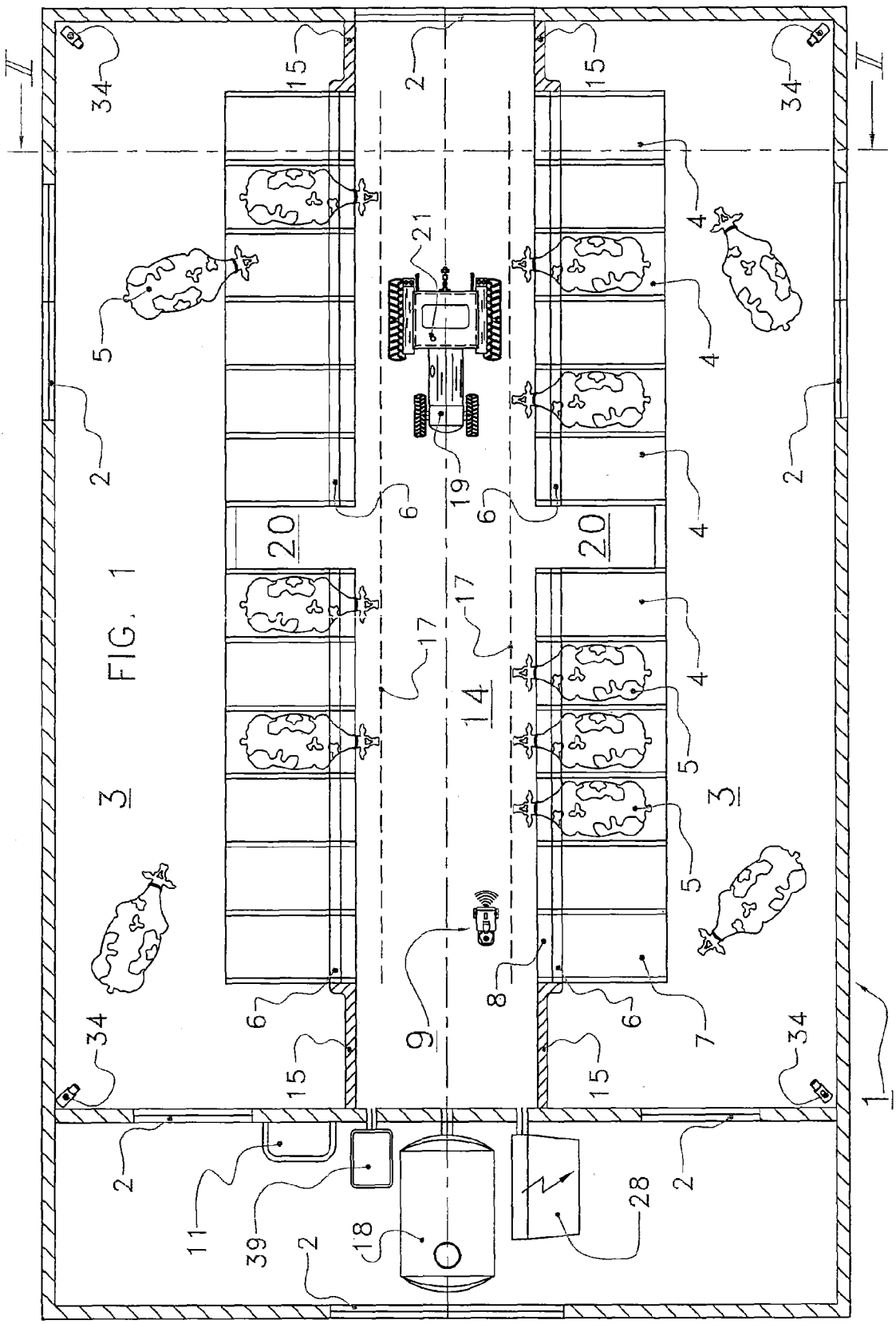
FIG. 1 shows diagrammatically a plan view of one embodiment of an assembly according to the invention, said assembly being included in a cowshed.
Figure 2:
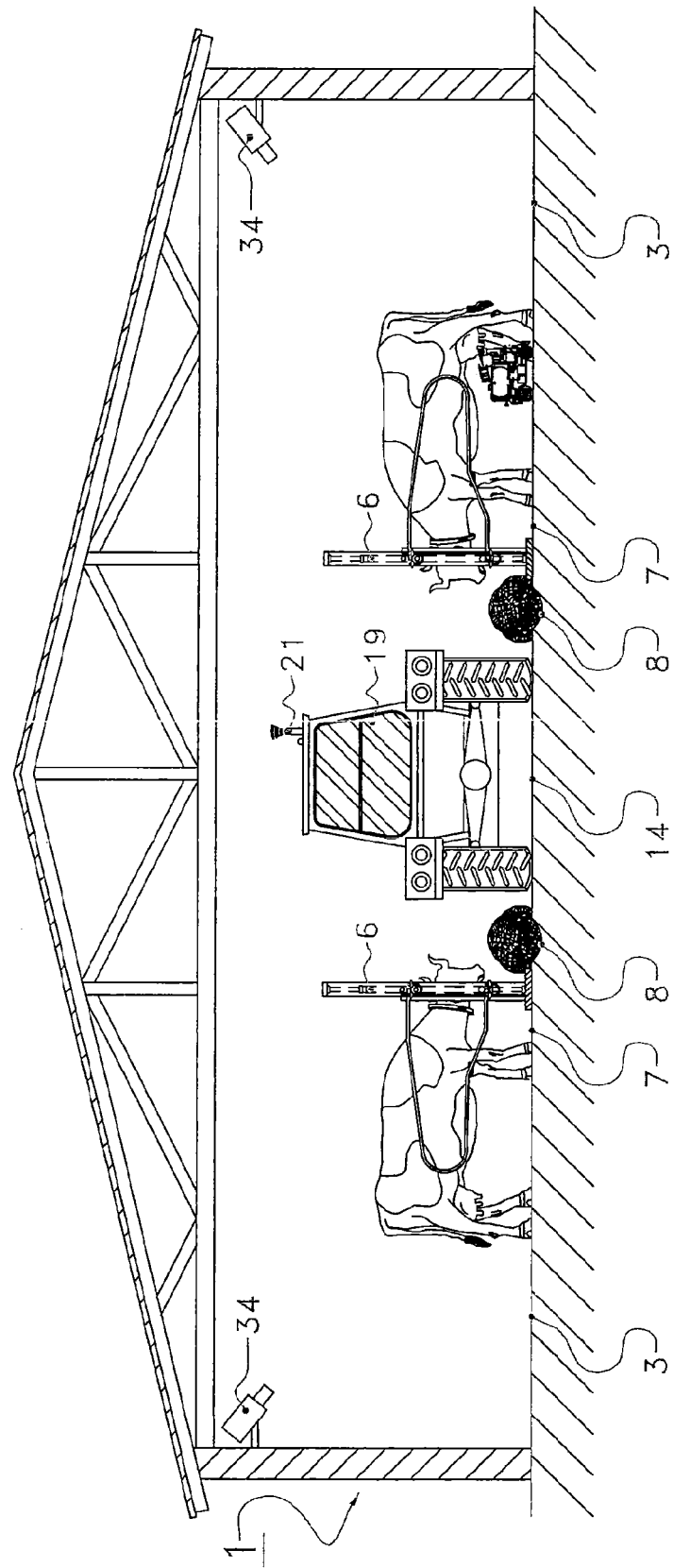
FIG. 2 shows diagrammatically a side view of FIG. 1.

A cowshed 1 with doors 2 constituting an entrance respectively an exit of the cowshed is shown in plan view in FIG. 1 (and in side view in FIG. 2). An assembly for feeding and milking animals according to the invention is included in the cowshed 1. Said assembly is provided with an area 3 where the animals are allowed to move freely.

The assembly further comprises a number of juxtaposed feeding stations 4 for the cows 5. In the embodiment shown, each feeding station 4 has a longitudinal direction, so that the feeding stations 4 are juxtaposed in their longitudinal direction. However, it will be obvious that, in an alternative embodiment, the feeding stations may be disposed lengthways, or may be positioned such that they are juxtaposed so as to form a curve or a circle. Furthermore, the feeding station itself may be designed in various ways that are known per se.

The assembly is provided with a number of feeding gates 6. Each feeding gate 6 divides a feeding station 4 into a first feeding station portion 7 that may be referred to as a standing portion and is intended as a stand for a cow 5, and a second feeding station portion 8 that may be referred to as a feeding portion and is intended for containing feed, such as in particular roughage. The feeding gate 6 is thus disposed between the first feeding station portion 7 and the second feeding station portion 8. The feeding gates 6 preferably extend over at least two feeding stations 4, and in particular over all the (immediately) juxtaposed feeding stations 4.

For the purpose of retaining a cow 5 at a feeding station 4, in order that a cow related treatment, such as milking, can be performed, the assembly according to the invention is further provided with a retaining device (described in greater detail with reference to FIGS. 3 and 4) that is fixedly disposed at a feeding station 4. Each feeding station 4 preferably has its own retaining device. The retaining devices can be activated for retaining a cow 5 and be deactivated for releasing a cow 5. Although various forms of retaining devices may be applied within the scope of the invention, for the sake of the simplicity of the construction it is advantageous if the retaining device is integrated in the feeding gate, which will be described with reference to FIGS. 3 and 4.

The assembly according to the invention further comprises a mobile milking robot 9 for connecting at least one teat cup 10 (see FIGS. 5 and 7) to a teat of a cow 5. According to the invention, the mobile milking robot 9 is constituted by a self-propelled (i.e. autonomous) mobile milking robot 9, i.e. that the mobile milking robot 9 has the possibility of choosing freely in which direction it is going to move (such a robot may be of the type disclosed in co-pending US Published Application No. US2002/0033137, or US Published Application No. US2002/0033139, the contents of both these applications being hereby incorporated by reference in their entireties). This implies that the mobile milking robot 9 is not only capable of moving in a reciprocating manner via rails or the like. For controlling the operation and movement of the mobile milking robot 9 there is provided a computer system 11. Said computer system 11 can co-operate with a control program 12 (FIG. 7) for controlling the mobile milking robot 9, which control program may be disposed partially or completely in the mobile milking robot 9. For moving the mobile milking robot 9 there may be used position-determining devices 13 (FIG. 7), such as for example an ultrasonic sensor, GPS or the like, for providing position information to be used in the control program 12 and/or by the computer system 11. As will be described hereinafter, the mobile milking robot 9 comprises the milking means that are required for milking a cow 5.

Figure 5:
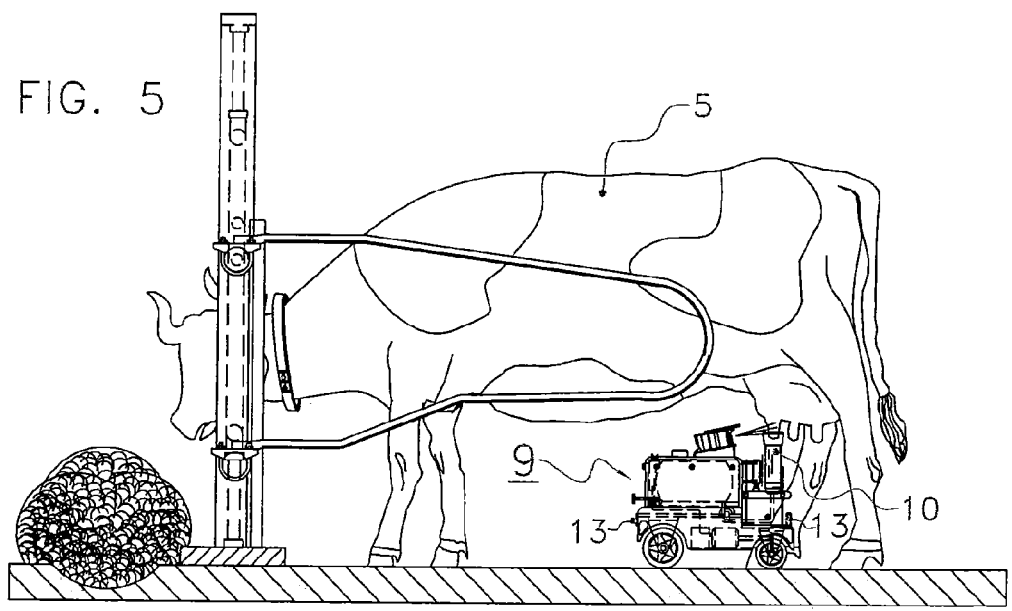
FIG. 5 shows diagrammatically a side view of a mobile milking robot to be used in an assembly according to the invention, the milking robot being positioned under a cow.
Figure 6:
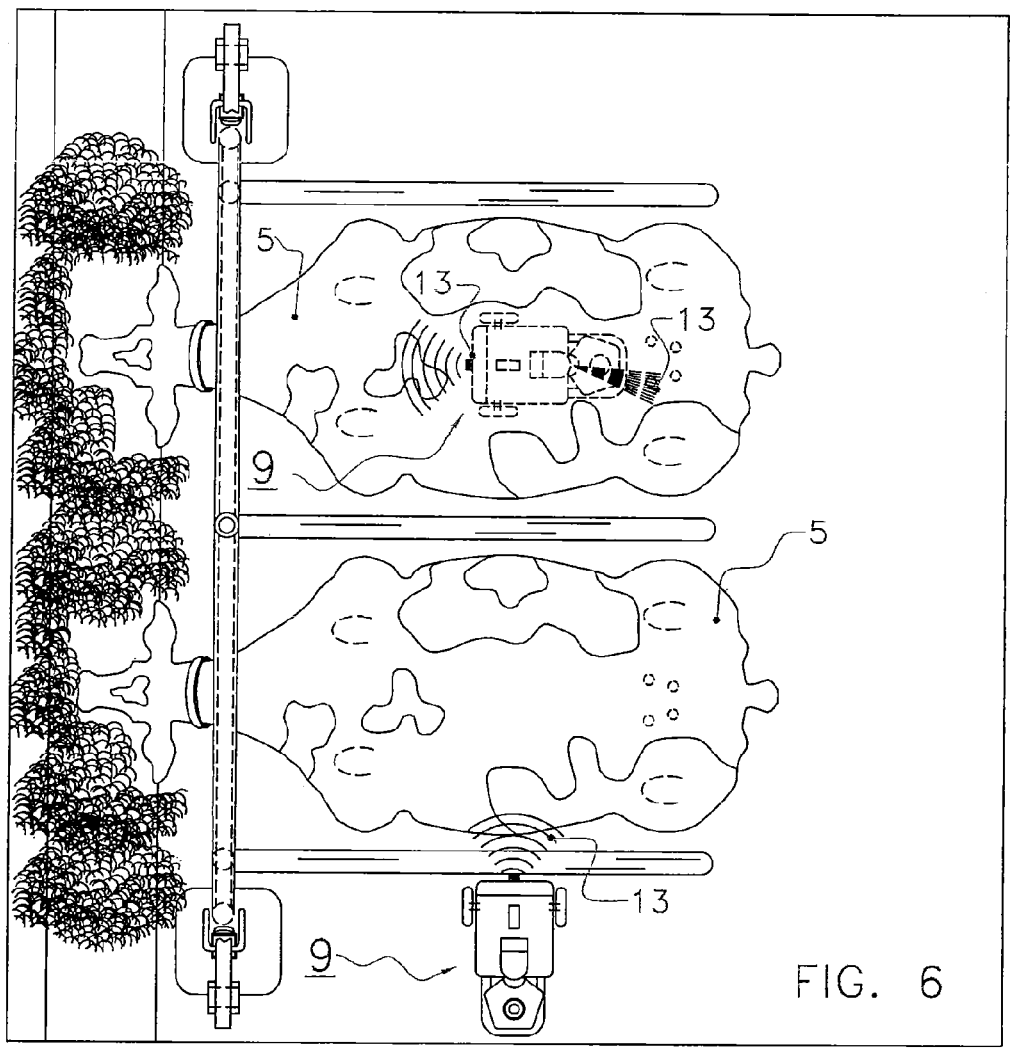
FIG. 6 shows diagrammatically a plan view of FIG. 5.

As is apparent from FIG. 5, the mobile milking robot 9 is dimensioned such that it can be placed as a whole under a cow 5 between the legs of said cow. The mobile milking robot 9, that has a main direction (in the case shown in FIG. 6 a longitudinal direction), comprises an orientation device (in the case shown the position-determining device 13 is used for this purpose), for determining the orientation of the main direction of the cow 5 to be milked. At least partially with the aid of data from the orientation device 13, the mobile milking robot 9 is positioned relative to the cow 5, so that the milking can be performed. Said position is preferably such that the entire mobile milking robot 9 is located under the cow 5, as shown in FIG. 6. The orientation device needs not necessarily to be disposed on the mobile milking robot 9, but may also be disposed in the cowshed 1 and be in connection with the computer system 11.

Figure 7:
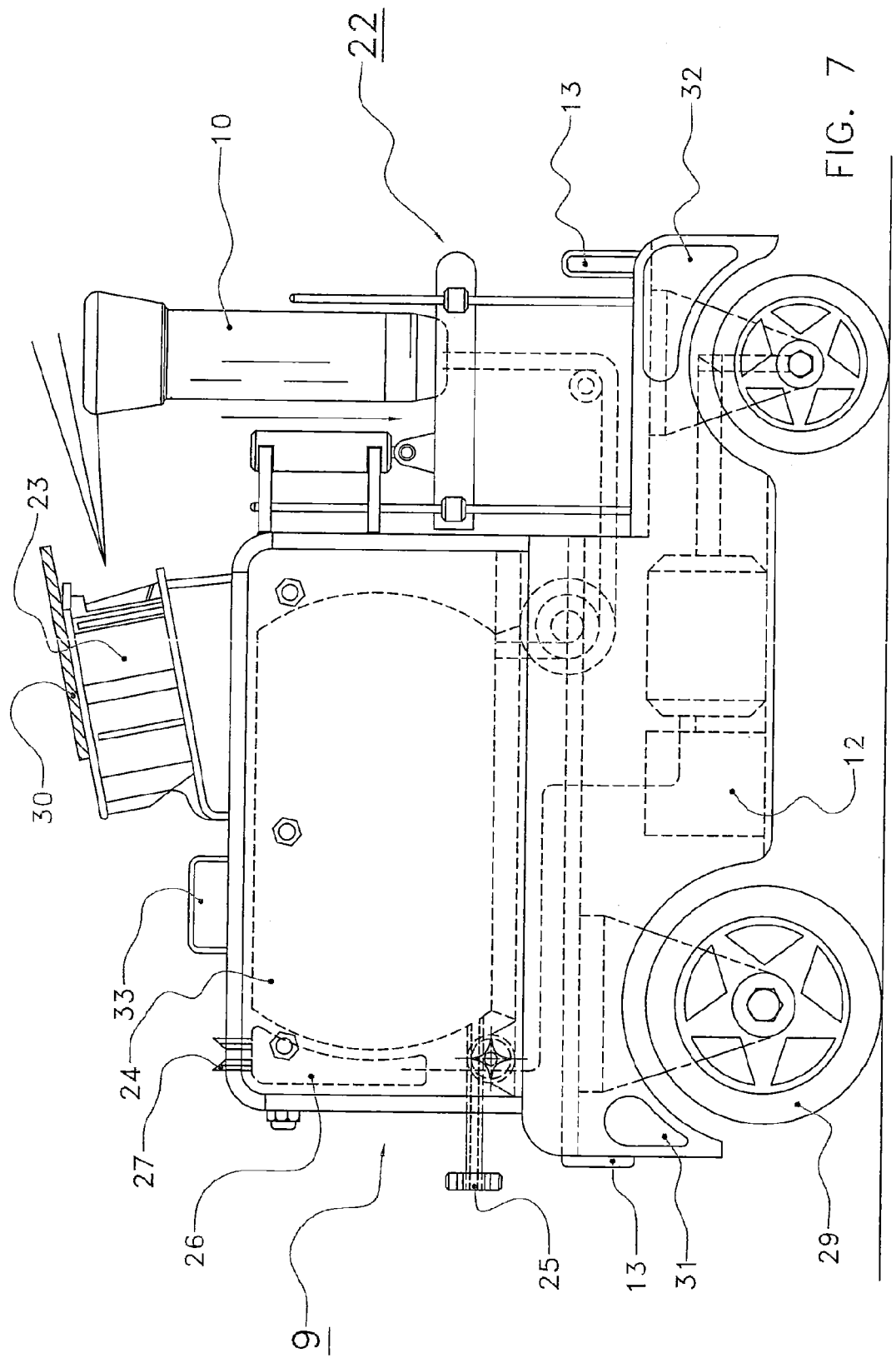
FIG. 7 shows diagrammatically a side view of a mobile milking robot to be used in an assembly according to the invention.

The mobile milking robot 9 shown in FIG. 7 is provided with one teat cup 10 and with connecting means 22 for connecting the teat cup 10 to the teat of a cow to be milked. Said connecting means are known per se, and are partially controlled with the aid of data obtained by a teat-position-determining device 23 (for example a laser sensor) for detecting the position of the teat of the cow to be milked relative to the teat cup 10.

In the embodiment shown, the mobile milking robot 9 is provided with one teat cup 10. There may also be provided two or four teat cups, of course. The mobile milking robot 9 is further provided with a milk storage jar 24 for storage of the milk obtained during milking. The milk storage jar 24 is provided at its lower side with an outlet 25 for the milk. Said outlet 25 can automatically be connected to the milk-collecting tank 18 with the aid of a (non-shown) conveying device, as elucidated in the foregoing.

The mobile milking robot 9 is further provided with its own energy supply 26 that is in particular rechargeable. The rechargeable energy supply 26 is provided with a charging port 27 that can automatically be coupled (as will be elucidated hereinafter) to a charger device 28 (see FIG. 1) that is preferably disposed at the milk-collecting tank 18.

The mobile milking robot 9 is provided with wheels 29 and is suitable for moving over the ground by rolling.

For the purpose of transmitting data to and receiving data from the computer system 11, the mobile milking robot 9 is provided with (non-shown) transmitting and/or receiving devices known per se for transmitting and/or receiving data to and/or from the computer system.

In order to prevent damage caused by collisions, the mobile milking robot 9 is provided with a vicinity detector, in the embodiment shown constituted by the position-determining devices 13, for detecting the vicinity of an object. If an object comes too near and a collision threatens to take place, then a protecting device 30, 31, 32 for protecting at least a part of the milking robot 9 can be brought from an inactive position into an active protecting position. In this case inflatable or shiftable protecting devices may be used. Bringing a protecting device from an inactive position into an active protecting position is controlled with the aid of data from the vicinity detector. Such a vicinity detector is known per se and may comprise a camera, an approach sensor or the like.

In order to prevent collisions, the mobile milking robot 9 may be provided with a signal-issuing device 33 for issuing a perceptible signal; the signal-issuing device 33 can be activated in particular with the aid of data from the vicinity detector.

The mobile milking robot is further provided with a malfunction detector (known per se and not shown in the drawing) for detecting an internal malfunction. In case of an occurring or expected malfunction, an alarm-signal-issuing device can issue an alarm signal. In order to protect the cows, the retaining device is at least partially controlled with the aid of data from the malfunction detector, and the mobile milking robot can also be deactivated as a whole with the aid of data from the malfunction detector.

As shown in FIGS. 1 and 2, the assembly comprises cameras 34 (or comparable tracking devices such as radar, radio communication, or GPS) for following or monitoring mobile units (cows, milking robot, tractors, human beings) in the assembly. Such cameras with associated software in the computer system can be used for monitoring the assembly, and for identification and position determination of the mobile units in the assembly.

The mobile milking robot 9 is capable of rolling to the milk-collecting tank 18 and positioning itself at that place in a predetermined position. In said position auxiliary means can automatically be connected to the mobile milking robot. Said auxiliary means can be moved to a certain position on the mobile milking robot by means of robot arms that are known per se. In this case position-determining devices, such as cameras, lasers and the like, can be used for the control of the robot arms. The mobile milking robot may also be provided with position beacons for indicating the place to which a relevant robot arm has to move. A charger device can automatically be moved for example to the charging port of the mobile milking robot, and can be coupled there for charging the rechargeable energy supply. In this case charging is only activated, of course, if a coupling detector (for example constituted by a contact sensor) detects a correct coupling of the charger device to the charging port. Analogously, a conveying device for conveying the milk from the mobile milking robot to a milk-collecting tank can be operated. Apart from this, cleaning and/or disinfecting the exterior of the mobile milking robot and/or the milking means for milking the cow is possible in an analogous manner. Cleaning devices 39 appropriate for this purpose are then preferably disposed in the vicinity of the milk-collecting tank. For cleaning the interior, a cleaning device can for example be coupled to the teat cup.

Although the mobile milking robot 9 is capable of moving through the entire cowshed 1, in particular through the area 3 where the cows 5 are allowed to move freely, in the embodiment shown the cowshed 1 is provided with a robot path 14 that is separated from the area 3 where the cows 5 are allowed to move freely. In the embodiment shown, this separation is achieved on the one hand by the feeding gates 6 and on the other hand by partitions 15. In the embodiment shown in FIG. 1, there are provided two rows of feeding stations 4 for the cows 5, that are juxtaposed in their longitudinal direction, the rows extending at least substantially parallel to each other. In this case the robot path 14 is located between the two rows of feeding stations 4.

The robot path 14 is contiguous to the second feeding station portion 8 of each feeding station 4, such that the second feeding station portion 8 is located between the robot path 14 and the first feeding station portion 7. The mobile milking robot 9 can thus be moved from the robot path 14 to the first feeding station portion 7 where a cow 5 that should be milked may be present. In this case the feeding gate 6 may be designed such (for example by means of robot passages 16, see FIG. 3), that the mobile milking robot 9 can be moved through the feeding gate 6.

When the mobile milking robot 9 is moving on the robot path 14, this movement can partially be controlled by for example a positioning line 17 along which the mobile milking robot 9 can move quickly.

In the embodiment of FIG. 1, the assembly is further provided with a milk-collecting tank 18, known per se, for collecting milk obtained by the mobile milking robot 9. The milk-collecting tank 18 is contiguous to the robot path 14, so that the mobile milking robot 9 only has to cover a short way to the milk-collecting tank 18. Although it is possible for the milk-collecting tank 18 to be located beside the robot path 14, it is advantageous if the milk-collecting tank 18 is located at an end of the robot path 14. The other end of the robot path 14 may then be constituted by the door 2 which then provides access to for example a tractor 19 for supplying for example roughage to the feeding stations 4. If the robot path 14 is too long, the driving time for the mobile milking robot 9 for supplying the milk obtained to the milk-collecting tank 18 can be shortened by including a number of (non-shown) drain points in the robot path 14, which drain points are connected to the milk-collecting tank 18 and can automatically be connected to the mobile milking robot 9, as has been elucidated in the foregoing.

The robot path 14 is provided with at least one robot refuge area 20 that is only intended for the mobile milking robot 9. Such a robot refuge area 20 can be occupied by the mobile milking robot 9 in order to prevent that the mobile milking robot 9 collides with a tractor 19. For the purpose of moving the mobile milking robot 9 to the robot refuge area 20, the assembly is provided with a refuge-signal-emitting device 21, that is for example disposed on the tractor 19 and can be operated by a (non-shown) farmer. Furthermore, the drain points, if any, for the milk-collecting tank 18, and further components, such as cleaning installations, charging stations for a rechargeable energy supply 26 of the mobile milking robot 9 and the like, may be located at the robot refuge area 20.

Figure 3:
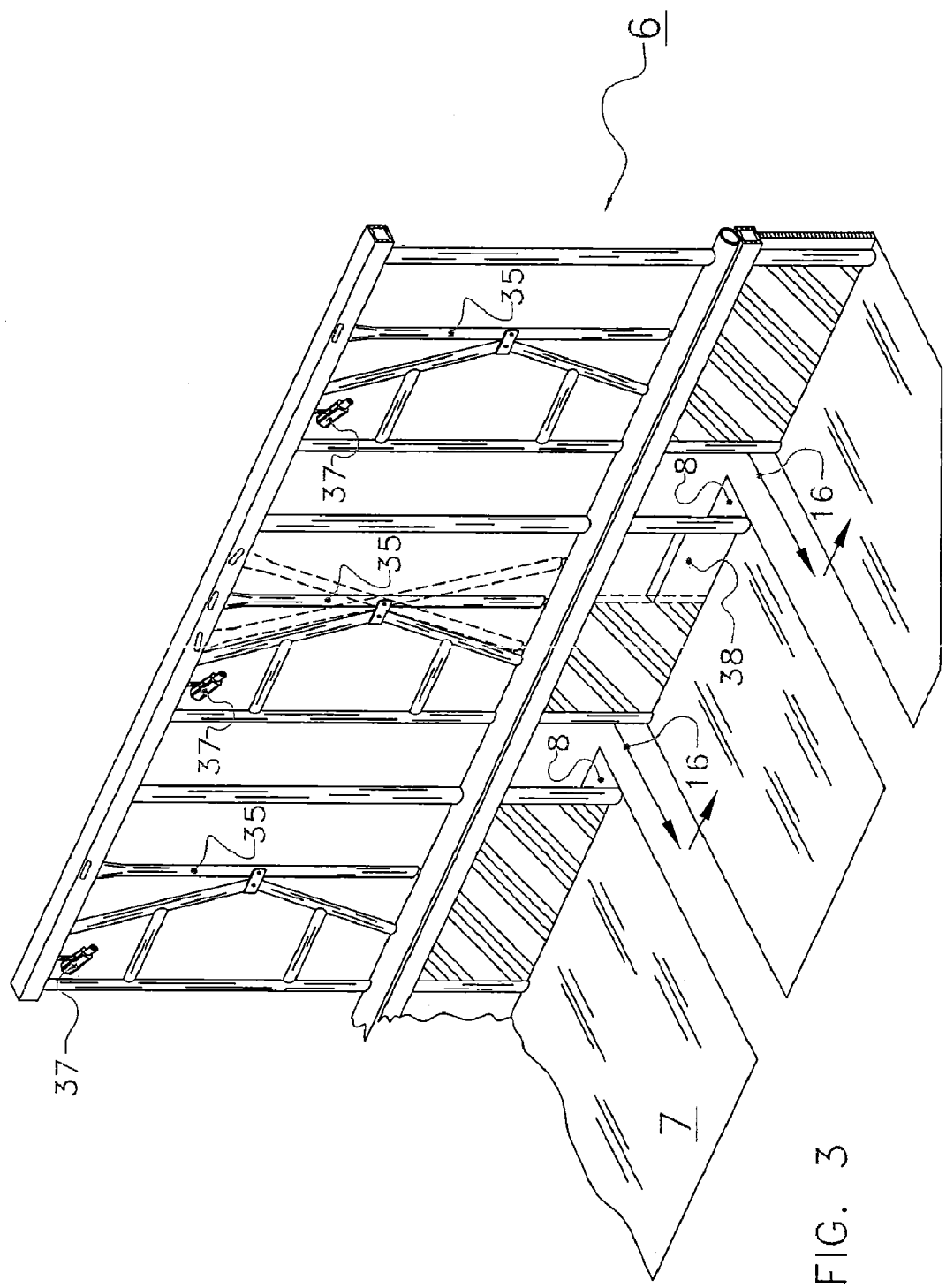
FIG. 3 shows diagrammatically a perspective view of a feeding gate to be used in an assembly according to one embodiment of the invention.
Figure 4:
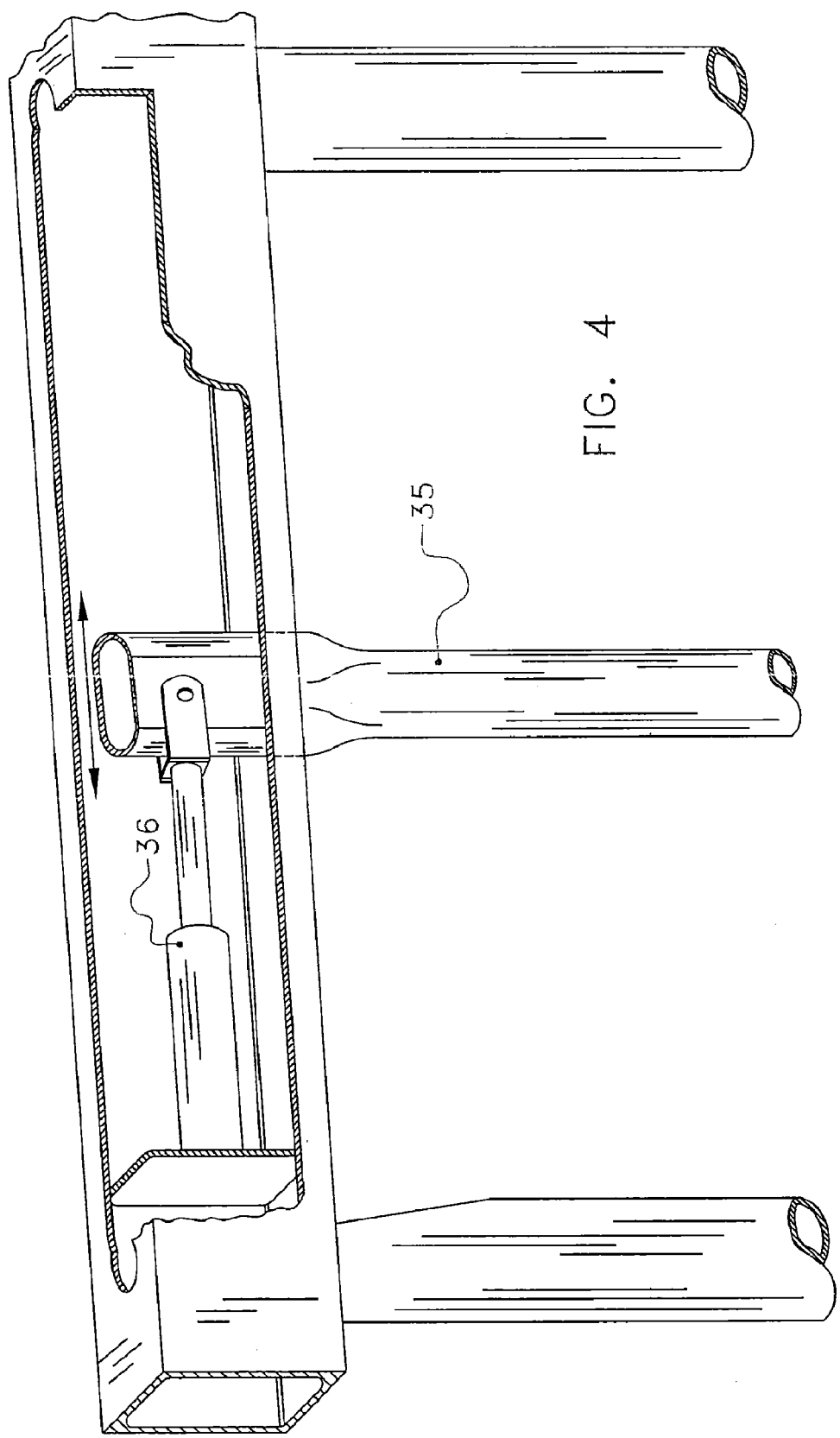
FIG. 4 shows diagrammatically a cut-away detail of FIG. 3.

An embodiment of a feeding gate 6 with integrated retaining devices 35 is shown in FIGS. 3 and 4. The retaining device 35 is constituted in this case in a manner known per se by a bar that can be brought into different positions. In the various positions a cow is either retained or released (in one of these positions the head of a cow is "forced" upwards, and in a vertical position of the bar the cow is released without being "forced" in a certain direction). FIG. 4 shows a control device 36 (in the form of a cylinder) for controlling the retaining device 35 into a relevant position.

The retaining feeding gate shown in FIGS. 3 and 4 may be self-closing, in which case the cow, when she is in a particular position relative to the feeding gate, automatically activates the retaining devices. If other forms of retaining devices are used, it is advantageous to use an animal-position-determining device 37, such as a camera, for determining the position of the cow relative to the retaining device and/or the feeding gate. The retaining device 35 can then be activated with the aid of data from said device 37. In this case there may also be used an animal identification device known per se that is preferably disposed at each feeding station.

For the purpose of closing a particular feeding station 4 for a particular cow, the assembly is provided with closing means 38, for example an upwardly slidable partition, that can be activated for closing a feeding station. Such a closing means may partially be controlled with the aid of data from the animal-position-determining device and/or the animal identification device. In this case data from the computer system and/or the mobile milking robot may also be used.

The functioning of an embodiment of an assembly according to the invention will be elucidated briefly hereinafter.

Every cow present in the cowshed is provided with a transponder. By means of identification devices and cameras disposed at different places in the cowshed, in particular at the feeding stations, information in relation to the identity of the relevant cow and her position in the cowshed is transmitted to the computer system and/or the mobile milking robot.

With the aid of the computer system, that also receives milking-process-stage information (for example milking-process-end and milking-run-data (point of time of milking, duration of the milking, milk yield, milk flow, etc.)) from the mobile milking robot, it is recorded which cow has been milked at a particular moment with the aid of the milking robot 9 and how much time has already elapsed after this milking run. On the basis of the time elapsed after a milking run, the computer system is capable of determining which cows of the herd should be milked in the near future. These cows can be included in a so-called working file, said working file being a subset of the herd.

The computer system controls the mobile milking robot and the relevant retaining devices with the aid of position information from the mobile milking robot and position information from one of the cows that are included in the working file. If one of the cows from the working file is present in a feeding station, said cow is retained by means of the retaining device, and the mobile milking robot is controlled to said cow for milking her. The mobile milking robot then moves via the robot path to the relevant feeding station, and via the second feeding station portion (or crossing places that are especially appropriate for that purpose) to the first feeding station portion, where the mobile milking robot positions itself in a predetermined position, preferably parallel to and under the cow, and there connects the teat cup(s). Hereafter the automatic milking can start, it being possible to obtain milking data during milking. After the milking process has ended, the teat cups are disconnected, and the mobile milking robot can move again to the robot path. The retaining devices can then be deactivated, so that the cow is released. If desired, there may elapse a certain period of time between the end of the milking process and the release of the cow, for example to prevent that the cow lies down before the lock hole has been closed.

Hereafter the mobile milking robot moves to the milk-collecting tank. Here the milk-conveying device for conveying the milk obtained to the milk-collecting tank is automatically fitted to the outlet of the milk storage jar. If required, the energy supply is charged (recharged) and the exterior and interior of the milking robot are cleaned and/or disinfected.

For activating the retaining devices, the computer system compares the identity of the relevant cow with an activation file. This activation file includes which cow should be retained or not be retained during milking and, if so, for how long (for example only during the connection, or on the contrary until the end of the milking process or until another milking-process-stage has been attained or has ended). The activation file may further include that for a particular cow retaining means of one or more adjacent feeding stations should be activated (and if so, for how long).

The computer system analogously controls the deactivation with the aid of a deactivation file that is capable of controlling a central or individual deactivation. Also in this case the data may relate to adjacent retaining devices. The deactivation may be controlled alternatively or additionally by the mobile milking robot itself.

On determining which cow from the working file should be milked first, it is not only possible to make use of a priority position in the working file, but also of the distance from the cows from the working file to the mobile milking robot. Due to this, it is possible to retain cows that are located within a predetermined distance from the determined position of the milking robot, and to milk them prior to other cows.

Because some cows might be frightened by a milking robot moving through the feeding gate in their vicinity, for those cows the milking robot can be controlled to a nearby unoccupied feeding station, where said milking robot moves from the robot path to the first feeding station portion. After having arrived there, it is possible for the mobile milking robot to reach the relevant cow by moving underneath other cows.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of feeding and milking animals in a feeding area provided with a number of juxtaposed feeding stations for the animals, the method comprising:
   determining a first feeding station where a first animal to be milked is present;
   retaining the first animal in the first feeding station during milking of the first animal;
   retaining, in response to the determining step, a second animal present in an adjacent feeding station that is adjacent to the first feeding station;
   moving a mobile milking robot, wherein the robot comprising a milking device for milking the animals to the first animal; and
   milking the first animal by the milking device.

2. A method as claimed in claim 1, wherein each feeding station has a longitudinal direction, and the feeding stations are juxtaposed in their longitudinal direction.

3. A method as claimed in claim 1, wherein the step of retaining a second animal includes retaining animals present in at least the feeding stations located immediately on both sides of the first feeding station.

4. A method as claimed in claim 1, wherein the method further comprises identifying the first animal.

5. A method as claimed in claim 4, wherein the step of retaining a second animal is made with the aid of an activation file that contains per first animal, data in relation to whether or not to retain nearby animals during milking said first animal.

6. A method as claimed in claim 4, wherein the method further comprises releasing a retained animal with the aid of data from a deactivation file.

7. A method as claimed in claim 1, wherein the method comprises determining data about the stage of the milking process, and releasing a retained animal with the aid of the data.

8. A method as claimed in claim 1, wherein the method further comprises:
   determining the position of the mobile milking robot;
   determining those animals at a feeding station within a predetermined distance from the position of the mobile milking robot; and
   retaining at the feeding stations the animals that are located within the predetermined distance from the mobile milking robot.

9. A method as claimed in claim 1, wherein the method further comprises determining the main direction of the mobile milking robot relative to the orientation of the main direction of the first animal, and bringing the mobile milking robot into a predetermined position relative to the first animal.

10. A method of feeding and milking animals that are allowed to move freely in an area intended therefor, the method comprising:
   supplying feed in a feeding station with a number of feeding positions that are freely accessible to the animals;
   selecting at least one animal to be milked from the set of animals present in the feeding station;
   retaining temporarily a subset of the animals present in the feeding station with the aid of retaining devices that can be activated and deactivated and that are permanently provided at each feeding position, which subset comprises at least said one selected animal and at least one additional animal in an adjacent feeding station,
   moving a mobile milking robot to the at least one animal that has been retained and selected, and positioning the mobile milking robot relative to the at least one animal that has been retained and selected, and
   milking said animal that has been retained and selected by means of the mobile milking robot.

11. A method as claimed in claim 10, wherein the feed is roughage and the feeding station is a roughage station.

* * * * *